US008491747B2

(12) United States Patent
Dolan et al.

(10) Patent No.: US 8,491,747 B2
(45) Date of Patent: Jul. 23, 2013

(54) METHOD FOR FACILITATING ASSEMBLY OF A PRINTHEAD HAVING A POLYMER LAYER

(71) Applicant: Xerox Corporation, Norwalk, CT (US)

(72) Inventors: Bryan R. Dolan, Rochester, NY (US); John R. Andrews, Wilsonville, OH (US); Pinyen Lin, Rochester, NY (US); Bradley J. Gerner, Flagstaff, AZ (US); Antonio DeCrescentis, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/668,925

(22) Filed: Nov. 5, 2012

(65) Prior Publication Data

US 2013/0062007 A1 Mar. 14, 2013

Related U.S. Application Data

(62) Division of application No. 12/638,573, filed on Dec. 15, 2009, now Pat. No. 8,303,093.

(51) Int. Cl.
*B29C 65/00* (2006.01)
*B32B 37/00* (2006.01)
*B32B 38/04* (2006.01)

(52) U.S. Cl.
USPC .......................... 156/253; 156/272.9; 156/297

(58) Field of Classification Search
USPC ........ 156/253, 256, 272.8, 297; 83/29; 234/1, 234/38, 131; 29/890.1
See application file for complete search history.

(56) References Cited

U.S. PATENT DOCUMENTS

| | | | |
|---|---|---|---|
| 4,434,430 | A | 2/1984 | Koto |
| 5,612,725 | A | 3/1997 | Okimoto |
| 5,736,998 | A | 4/1998 | Caren et al. |
| 5,852,460 | A | 12/1998 | Schaeffer et al. |
| 5,872,583 | A | 2/1999 | Yamamoto et al. |
| 6,045,214 | A | 4/2000 | Murthy et al. |
| 6,136,212 | A | 10/2000 | Mastrangelo et al. |
| 6,209,203 | B1 | 4/2001 | Murthy et al. |
| 6,258,285 | B1 | 7/2001 | Silverbrook |
| 6,274,056 | B1 | 8/2001 | Silverbrook |
| 6,378,984 | B1 | 4/2002 | Steinfield et al. |
| 6,443,179 | B1 | 9/2002 | Benavides et al. |
| 6,451,216 | B1 | 9/2002 | Silverbrook |
| 7,160,745 | B2 | 1/2007 | Ulmer et al. |
| 7,249,823 | B2 | 7/2007 | Wong et al. |
| 7,303,862 | B2 | 12/2007 | David |
| 7,494,557 | B1 | 2/2009 | Peterson |
| 7,585,785 | B2 | 9/2009 | Kirchhoff et al. |
| 2011/0141205 | A1 | 6/2011 | Gerner et al. |

*Primary Examiner* — Linda L Gray
(74) *Attorney, Agent, or Firm* — Maginot, Moore & Beck, LLP

(57) ABSTRACT

A method for assembling an inkjet jet print head enables piezoelectric transducers to be bonded to an inkjet ejector without closing inlets to a pressure chamber within the inkjet ejector. The method includes bonding a polymer layer to a diaphragm layer having a plurality of openings, bonding piezoelectric transducers to the diaphragm layer with a thermoset adhesive, placing thermoset polymer in areas between the piezoelectric transducers on the diaphragm layer, and drilling inlets through the thermoset polymer and the diaphragm at the openings in the diaphragm.

7 Claims, 3 Drawing Sheets

METHOD FOR FACILITATING ASSEMBLY OF A PRINTHEAD HAVING A POLYMER LAYER

PRIORITY CLAIM

This document claims priority to U.S. patent application Ser. No. 12/638,573, which was filed on Dec. 15, 2009 and is entitled "A Print Head Having A Polymer Layer To Facilitate Assembly Of The Print Head." The application issued as U.S. Pat. No. 8,303,093 on Nov. 6, 2012.

TECHNICAL FIELD

This disclosure relates generally to inkjet ejectors that eject ink from a print head onto an image receiving surface and, more particularly, to print heads having inkjet ejectors comprised of multiple layers.

BACKGROUND

Drop on demand inkjet technology has been employed in commercial products such as printers, plotters, and facsimile machines. Generally, an inkjet image is formed by the selective activation of inkjets within a print head to eject ink onto an ink receiving member. For example, an ink receiving member rotates perpendicular to a print head assembly as the inkjets in the print head are selectively activated. The ink receiving member may be an intermediate image member, such as an image drum or belt, or a print medium, such as paper. An image formed on an intermediate image member is subsequently transferred to a print medium, such as a sheet of paper, or a three dimensional object, such as an electronic board or bioassay.

FIGS. 3A and 3B illustrate one example of a single inkjet ejector 10 that is suitable for use in an inkjet array of a print head. The inkjet ejector 10 has a body 48 that is coupled to an ink manifold 12 through which ink is delivered to multiple inkjet bodies. The body also includes an ink drop-forming orifice or nozzle 14 through which ink is ejected. In general, the inkjet print head includes an array of closely spaced inkjet ejectors 10 that eject drops of ink onto an image receiving member (not shown), such as a sheet of paper or an intermediate imaging member.

Ink flows from the manifold to nozzle in a continuous path. Ink leaves the manifold 12 and travels through a port 16, an inlet 18, and a pressure chamber opening 20 into the body 22, which is sometimes called an ink pressure chamber. Ink pressure chamber 22 is bounded on one side by a flexible diaphragm 30. A piezoelectric transducer 32 is rigidly secured to diaphragm 30 by any suitable technique and overlays ink pressure chamber 22. Metal film layers 34 that can be coupled to an electronic transducer driver 36 in an electronic circuit can also be positioned on both sides of the piezoelectric transducer 32.

Ejection of an ink droplet is commenced with a firing signal. The firing signal is applied across metal film layers 34 to excite the piezoelectric transducer 32, which causes the transducer to bend. Upon actuation of the piezoelectric transducer, the diaphragm 30 deforms to force ink from the ink pressure chamber 22 through the outlet port 24, outlet channel 28, and nozzle 14. The expelled ink forms a drop of ink that lands onto an image receiving member. Refill of ink pressure chamber 22 following the ejection of an ink drop is augmented by reverse bending of piezoelectric transducer 32 and the concomitant movement of diaphragm 30 that draws ink from manifold 12 into pressure chamber 22.

To facilitate manufacture of an inkjet array print head, an array of inkjet ejectors 10 can be formed from multiple laminated plates or sheets. These sheets are configured with a plurality of pressure chambers, outlets, and apertures and then stacked in a superimposed relationship. Referring once again to FIGS. 3A and 3B for construction of a single inkjet ejector, these sheets or plates include a diaphragm plate 40, an inkjet body plate 42, an inlet plate 46, an outlet plate 54, and an aperture plate 56. The piezoelectric-transducer 32 is bonded to diaphragm 30, which is a region of the diaphragm plate 40 that overlies ink pressure chamber 22.

One goal of print head design is to provide increasing numbers of inkjet ejectors in a print head. The more inkjet ejectors in a print head, the greater the density of the ink ejected and the perceived quality of the image. One approach to increasing inkjet ejector density in a print head is to locate the manifold external of the inkjet ejector. One way of implementing this approach includes providing an inlet in the diaphragm layer for each ejector. Coupling the inlet to the manifold to receive ink for ejection from the ejector, however, requires an opening in the piezoelectric-transducer layer to enable ink flow from the manifold to the inlet and then into the pressure chamber in the inkjet body plate. Each opening in the piezoelectric-transducer layer is located in a polymer portion in the interstices between the piezoelectric transducers.

In the assembly of previously known layered print heads having piezoelectric actuators, also known as piezoelectric transducers, the process of mounting the layer containing the piezoelectric actuators and polymeric interstitial material to the diaphragm layer requires the use of a liquid thermoset polymer prior to curing. This thermoset polymer spreads and enters the openings in the piezoelectric-transducer layer and the inlets in the diaphragm layer and then cures. When the polymer is subsequently cured, it can partially block the ink flow path at the inlet or body regions. Removal of the cured thermoset polymer from the ink inlets is difficult. A print head assembly method that enables the layer containing the piezoelectric actuators to be mounted to a diaphragm layer and that prevents the flow of uncured polymers into undesired locations of the ink path would be useful.

SUMMARY

A method for assembling an inkjet jet print head enables piezoelectric transducers to be bonded to an inkjet ejector without partially blocking or closing inlets to a pressure chamber within the inkjet ejector. The method includes bonding a polymer layer to a diaphragm layer having a plurality of openings formed in the diaphragm layer, bonding piezoelectric transducers to the diaphragm layer with a thermoset adhesive, placing thermoset polymer in areas between the piezoelectric transducers on the diaphragm layer, and drilling inlets through the thermoset adhesive and the polymer layer at pre-existing holes in the diaphragm layer. In one embodiment, the drilling is done with a laser.

The method produces piezoelectric print heads in which the location of thermoset adhesive has been controlled by the presence of the polymer layer covering pre-existing holes in the diaphragm layer. The blocking polymer layer is on the side of the diaphragm opposite the piezoelectric transducers and the thermoset polymer. The piezoelectric print head includes a body layer in which a plurality of pressure chambers is configured, a diaphragm plate having a plurality of openings, a polymer layer interposed between the body layer and the diaphragm plate, a plurality of piezoelectric transducers bonded to the diaphragm plate, thermoset polymer filling a region between the piezoelectric transducers bonded to the diaphragm plate, and openings through the polymer layer and thermoset polymer that align with the openings in the diaphragm plate.

BRIEF DESCRIPTION OF THE DRAWINGS

The foregoing aspects and other features of forming inlets through a polymer layer and thermoset polymer filling interstitial space between piezoelectric transducers are explained in the following description, taken in connection with the accompanying drawings.

DETAILED DESCRIPTION

Figure 1A:
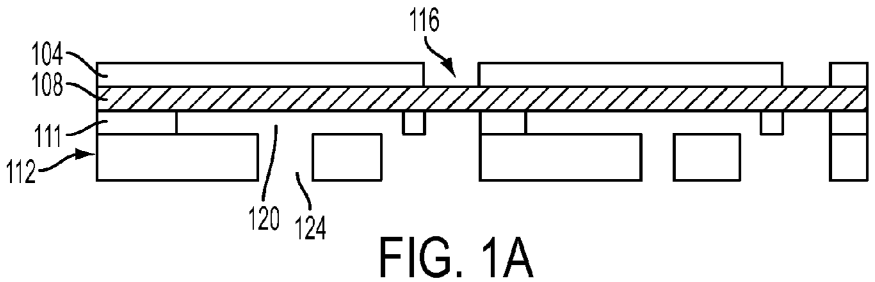
FIG. 1A is a profile view of a partially completed inkjet print head including a diaphragm layer, body layer, and a polymer layer.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, biological assays, printed organic electronics, mask making, 3D structure building, etc. The word "ink" can refer to wax-based inks known in the art but can refer also to any fluid that can be driven from the jets including water-based solutions, solvents and solvent based solutions, and UV curable polymers. The word "polymer" encompasses any one of a broad range of carbon-based compounds formed from long-chain molecules including thermoset polyimides, thermoset adhesives, thermoplastics including thermoplastic polyimides, resins, polyetherether ketone, polyetherimide, polysulfone, polycarbonates, and many other compounds known to the art. The word "metal" may encompass either single metallic elements including, but not limited to, copper, aluminum, or titanium, or metallic alloys including, but not limited to, stainless steel or aluminum-manganese alloys. A "transducer" as used herein is a component that reacts to an electrical signal by generating a moving force that acts on an adjacent surface or substance. The moving force may push against or retract the adjacent surface or substance.

FIG. 1A is a profile view of a partially completed inkjet print head including a diaphragm layer 104, body layer 111, and a thermoplastic polymer layer 108. The diaphragm layer 104 may be formed from a metal, ceramic, glass, or plastic sheet that has one or more ink ports 116 that extend through the layer, with one ink port corresponding to each pressure chamber 120 in the body layer 111. The diaphragm plate should be thin enough to be able to flex easily, but also resilient enough to return to its original shape after it has been deformed. The diaphragm layer is bonded to a polymer layer, which is bonded as an unbroken sheet. DuPont ELJ-100® is an example of a material that is suitable to form the polymer layer. The polymer layer may also be formed from a polyimide material or other polymers including polyetherether ketone, polysulfone, polyester, polyethersulfone, polyimide-amide, polyamide, polyethylenenaphthalene, etc. The polymer layer can be a self-adhesive thermoplastic or have a thin layer of adhesive deposited on the side of the polymer layer that is placed in contact with the body layer 111. Alternatively, another thermoplastic or thermoset adhesive could be used to bond the polymer layer to the diaphragm. In yet further alternatives the adhesive could be a dispensed or transfer film of liquid adhesive.

The body layer is bonded to the opposite side of the polymer layer. The fluid path layer may be formed from one or multiple metal sheets that are joined via brazing as shown here as the body plate 111 and the outlet plate 112. The fluid path layer could also be made from a single structure molded, etched or otherwise produced. The fluid path layer contains openings or channels through the various layers that form paths and cavities for the flow of ink through the finished print head. A pressure chamber is structured with diaphragm layer 104 and polymer layer 108 forming the top portion, the body plate 111 and the outlet plate 112 forming the fluid body layer and providing the lateral walls and base for the pressure chamber. The chamber base has an outlet port 124 that allows ink held in the pressure chamber to exit the body layer when the diaphragm is deformed by a piezoelectric transducer (not shown).

Figure 1B:
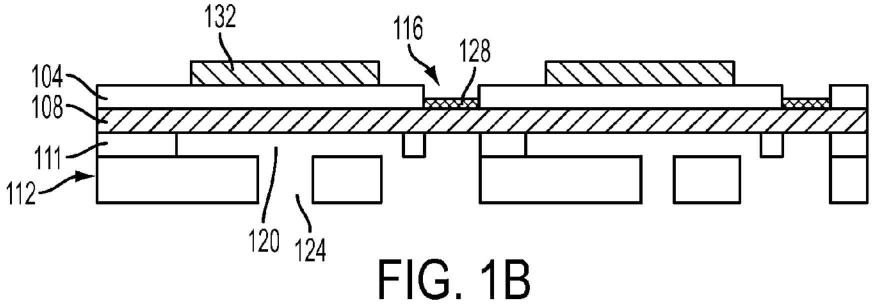
FIG. 1B is a profile view of the same partial inkjet print head of FIG. 1A additionally including piezoelectric transducers bonded to the diaphragm layer.

FIG. 1B is a profile view of the same partial inkjet print head of FIG. 1A additionally including bonded piezoelectric transducers. In this view, a piezoelectric transducer 132 has been bonded to the diaphragm plate 104 in alignment with the pressure chamber 120. In order to bond the piezoelectric transducers to the appropriate locations, they are first arranged on a carrier plate (not shown) with the sides opposite the diaphragm plate temporarily affixed to the carrier plate. Then, a thermoset polymer, typically an epoxy, is deposited on the surface of the diaphragm sheet. The carrier plate is aligned with the diaphragm plate, and pressure and heat are applied until the thermoset polymer has bonded the piezoelectric transducers to the diaphragm plate. The carrier plate is then released using known techniques from the piezoelectric transducers. The pressure from the bonding process squeezes excess thermoset polymer 128 from under the piezoelectric elements, leaving residual adhesive on the exposed diaphragm, some of which may flow into the ink ports 116. Flow of the bonding adhesive is stopped at the polymer bonding layer 108. The piezoelectric transducers are now rigidly bonded to the diaphragm plate so that when one of the piezoelectric transducers deforms, the diaphragm plate deforms in the same direction.

Figure 1C:
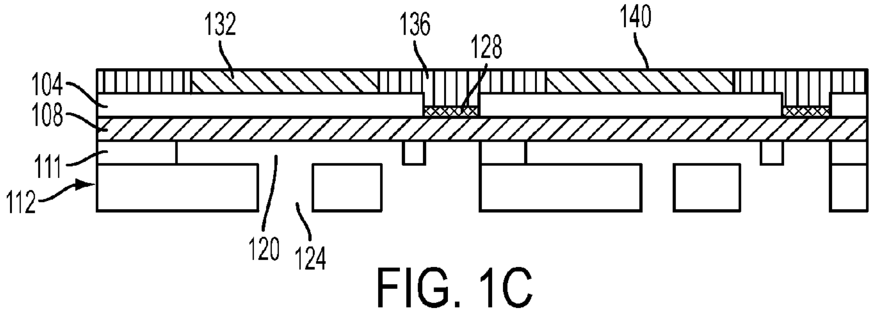
FIG. 1C is a profile view of the same partial inkjet print head of FIG. 1B further including thermoset polymer filling an interstitial area between the piezoelectric transducers.

FIG. 1C is a profile view of the same partial inkjet print head of FIG. 1B further including an interstitial polymer layer 136 formed between the piezoelectric transducers. This layer fills in the spaces between piezoelectric transducers including the pre-existing openings in the diaphragm layer. The interstitial polymer can be deposited as an uncured liquid by a number of means including flowing, dispensing or capillary filling. To ensure filling of the interstitial space, the thermoset polymer is added until it covers or partially covers the transducer upper surface. The thermoset polymer is then cured. In some embodiments, a thin sheet of non-stick polymer, such as polytetrafluoroethylene (commonly referred to as PTFE and sold commercially as Teflon®), may be applied to the upper surface of the thermoset polymer before curing to planarize the surface. This PTFE layer is then removed after curing. Alternatively, a UV curable polymer could be used for the interstitial fill and then a UV light used to cure the polymer. After curing of the thermoset polymer and the removal of the PTFE sheet, if used, the piezoelectric transducers are electrically isolated by the cured thermoset polymer alone or the cured thermoset polymer and non-stick coating. The piezoelectric transducers are cleaned via laser ablation or reactive ion etching to remove the polymer film from upper transducer surface 140. The ink inlet holes are then drilled through the multiple polymer layers and through the pre-existing openings in the diaphragm.

Figure 2A:
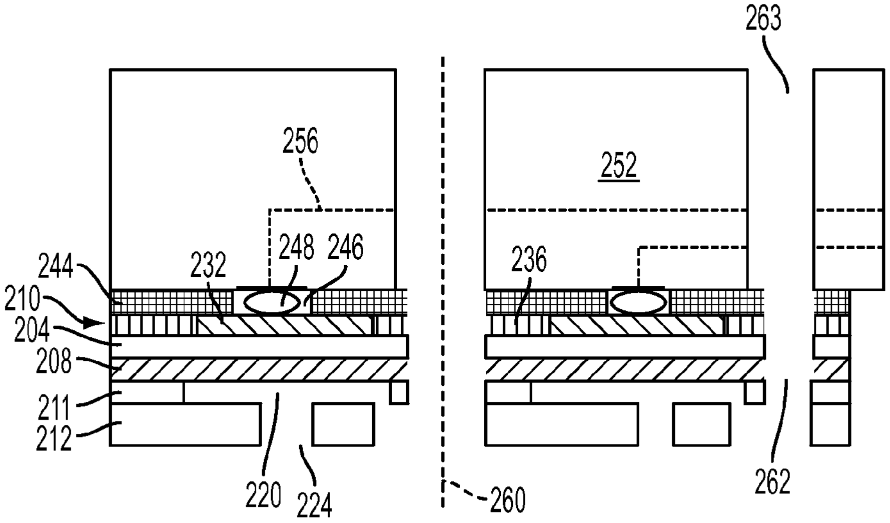
FIG. 2A is a profile view of the completed assembly of FIG. 1C after the assembly is bonded to an electrical circuit board and ink channels have been ablated.

FIG. 2A is a profile view of the completed assembly of FIG. 1C after the inkjet ejector is bonded to an electrical circuit board (ECB) 252 and the ink inlets have been ablated. In one embodiment, a laser is used to drill the ink passages 262 through the polymer layer 208, any interstitial polymer 236, and an electrical standoff layer 244. Many laser drilling processes can be used to form the ink passages through these layers. In one process an excimer laser illuminates a lithography mask with transparent regions corresponding to one or several of the ink passages that are to be drilled through the polymers. The laser illuminated mask openings are positioned on an exposed layer on the print head in alignment with the locations for the desired openings in the layer. The mask is then imaged onto the exposed surface. The substrate is then moved under a laser imaging system in a step and repeat process. Excimer lasers at 248 nm or 308 nm with laser fluence of 250 mJ/cm$^2$-800 mj/cm$^2$ are suitable parameters though other laser wavelengths and fluencies may be used. Alternatively, a scanned laser beam may be used to drill individual ink passages. In this alternative process, the laser can be scanned with galvanometer-driven mirrors and focused onto the substrate with a scan lens. The ink passages can be generated with a beam at a fixed position to produce each hole or it can be scanned in a circle or other shape to form each ink passage through the polymer layers. Preferred lasers for the scanned laser drilling include a solid state laser or a fiber laser at 355 nm or a $CO_2$ laser having a 9.4-10.6 μm wavelength.

In FIG. 2A, another layer of electrical insulator material, or standoff layer 244, has been bonded to the piezoelectric layer 210. The standoff layer has gaps 246 in its surface that correspond to the locations of the piezoelectric transducers 232. These gaps allow the piezoelectric transducers to expand in a direction away from the pressure chamber 220. A flexible, electrically conductive epoxy 248 is placed into the gaps to connect the electrically conductive traces 256 etched in the ECB 252 to the piezoelectric transducer surface electrodes 240. Pre-existing holes 263 in the ECB 252 are larger than the ink passages 262 and aligned with the ink passages so that the ink path is not interrupted by the circuit board 252. In another embodiment, the circuit board can be replaced by a flexible circuit having electrical pads aligned to the array of piezoelectric elements similar to the ECB. For the flexible circuit pre-existing holes for ink passages can exist, or in one embodiment, the ink passages are formed in the laser drilling process that forms the ink passage 262. As further described below, the full printhead assembly and order of layer processing can happen in many different orders so long as the polymer layer 208 is attached to the diaphragm 204 prior to the piezoelectric elements 232 and interstitial polymer 236 being added to the assembly.

Figure 2B:
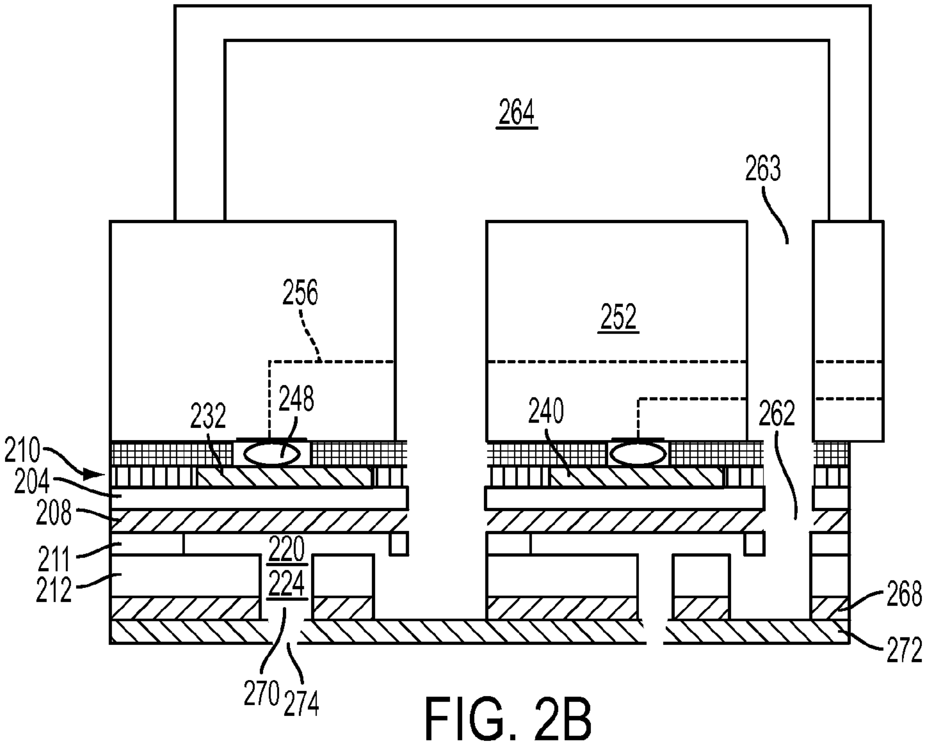
FIG. 2B is a profile view of a complete inkjet head including an outlet plate attached to the body layer and an ink manifold attached to a rigid or flexible electrical circuit layer.
Figure 3A:
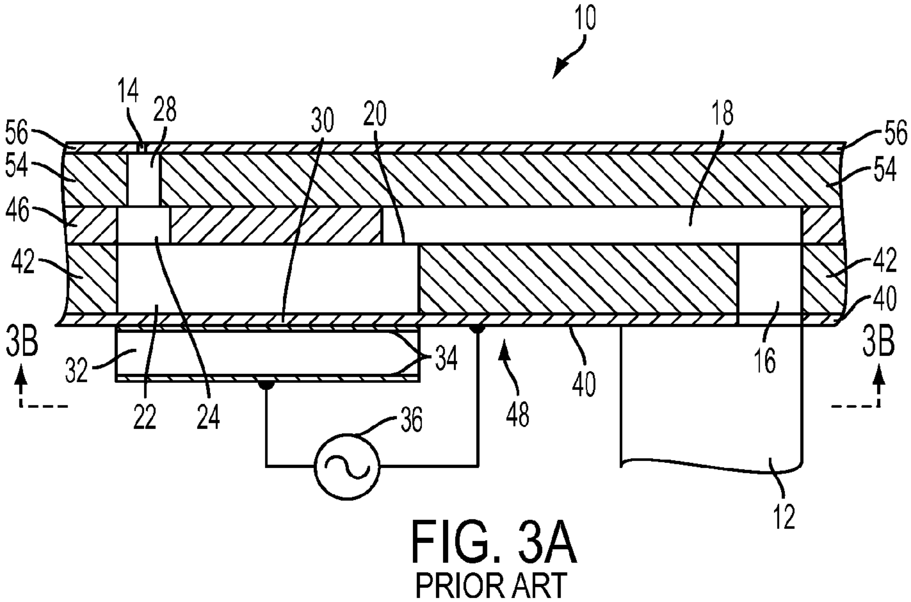
FIG. 3A PRIOR ART
FIG. 3A is a schematic cross sectional side view of a prior art embodiment of an inkjet.
Figure 3B:
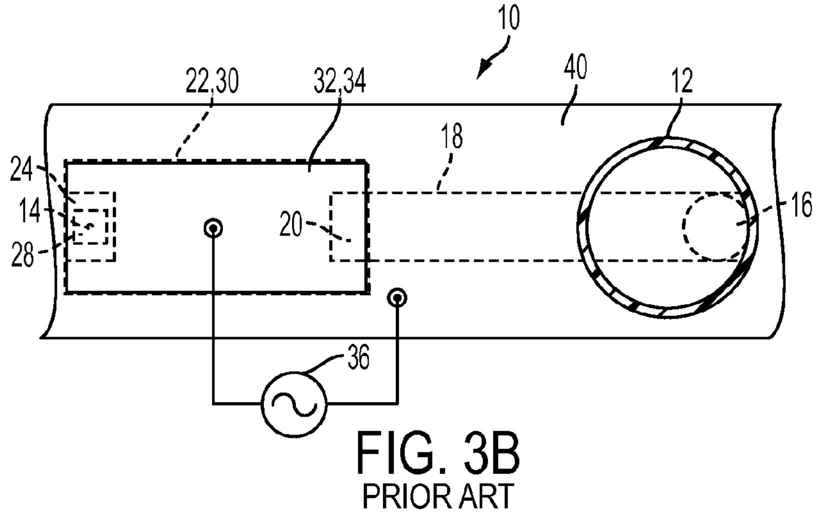
FIG. 3B PRIOR ART
FIG. 3B is a schematic view of the prior art embodiment of the inkjet of FIG. 3A.

FIG. 2B is a profile view of a complete inkjet head including an aperture plate 272 attached to the outlet plate 212 by aperture plate adhesive 268. The manifold 264 acts as an ink reservoir supplying ink to the inlets of one or more pressure chambers, and each pressure chamber has a dedicated ink inlet connected to the manifold. The body layer 211 is attached to an outlet layer 212 to form a portion of each pressure chamber. The aperture plate adhesive 268 includes an outlet channel 270 corresponding to each pressure chamber. The aperture plate 272 may be formed from metal or a polymer and has apertures or nozzles 274 extending through the plate to allow ink to exit the print head as droplets.

Other embodiments may have different numbers of layers or combine several functions into a single layer such as having a thin adhesive layer directly on the aperture plate that permits attachment of the aperture plate to the outlet plate 212. Other assembly and processing orders are also possible. For instance, polymer layer 208 can be bonded to the diaphragm 204 followed by the bonding of the piezoelectric elements 232 to the diaphragm and the adding and curing of the interstitial polymer 236. The inlets 262 can then be drilled prior to the bonding of a completed fluid stack consisting of a diaphragm 204, polymer layer 208, body plate 211, outlet plate 212, aperture plate adhesive 268, and aperture plate 272. Finally the electrical interconnection 248, 252, 256 can be completed and the manifold 264 added. Other combinations of these assembly orders are also possible.

In operation, ink flows from the manifold through ECB channel 263 and the inlet port 262 into the pressure chamber 220. An electrical firing signal sent to the piezoelectric transducer 232 via conductive traces 256 and conducting epoxy 248 or other means of producing the electrical connection 248 causes the piezoelectric transducer to bend, deforming the diaphragm 204 and polymer layer 208 into the pressure chamber. This deformation urges ink out the outlet port 224, into the outlet channel 270, and through the nozzle 274 where the ink exits the print head as a droplet. After the ink droplet is ejected, the chamber is refilled with ink supplied from the manifold with the piezoelectric transducer aiding the process by deforming in the opposite direction to cause the concomitant movement of the diaphragm and polymer layers that draw ink from the manifold into the pressure chamber.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for bonding a piezoelectric transducer layer with a diaphragm layer comprising:
- bonding a polymer layer to a diaphragm layer having a plurality of opening in the diaphragm layer;
- bonding piezoelectric transducers to the diaphragm layer with a thermoset adhesive;
- placing thermoset polymer in areas between the piezoelectric transducers on the diaphragm layer; and
- drilling inlets through the thermoset polymer and the diaphragm layer at the openings in the diaphragm layer.

2. The method of claim 1 wherein the drilling is performed with laser ablation.

3. The method of claim 1 further comprising:
- bonding an electrical standoff and an electrical interconnect to the piezoelectric transducers prior to drilling the inlets.

4. The method of claim 1 further comprising:
- planarizing the thermoset polymer.

5. The method of claim 4, the planarizing further comprising:

placing a layer of polytetrafluoroethylene (PTFE) over the thermoset polymer;

curing the thermoset polymer; and removing the PTFE layer.

6. The method of claim 1 further comprising:

bonding a fluid path plate having a body layer with inlet and outlet regions to the polymer layer before the piezoelectric transducers are bonded to the diaphragm layer.

7. The method of claim 1 further comprising:

bonding a fluid path plate having a body layer with inlet and outlet regions to the polymer layer after the piezoelectric transducers are bonded to the diaphragm layer.

* * * * *

UNITED STATES PATENT AND TRADEMARK OFFICE

CERTIFICATE OF CORRECTION

PATENT NO. : 8,491,747 B2
APPLICATION NO. : 13/668925
DATED : July 23, 2013
INVENTOR(S) : Bryan R. Dolan et al.

It is certified that error appears in the above-identified patent and that said Letters Patent is hereby corrected as shown below:

On Title Page Item (72):

Please delete “Wilsonville, OH” and insert -- Wilsonville, OR --

Signed and Sealed this
Twenty-seventh Day of August, 2013

Teresa Stanek Rea
*Acting Director of the United States Patent and Trademark Office*